3,584,007
PREPARATION OF 1-SUBSTITUTED-2-HYDROXY-
METHYL - 5-NITROIMIDAZOLES EMPLOYING
CHLORINATED BENZENES AS THE REACTION
MEDIUM
John M. Chemerda, Watchung, Janos Kollonitsch, West-
field, and Stephen Marburg, Plainfield, N.J., assignors
to Merck & Co., Inc., Rahway, N.J.
No Drawing. Filed Sept. 16, 1968, Ser. No. 760,091
Int. Cl. C07d 49/36
U.S. Cl. 260—309
3 Claims

ABSTRACT OF THE DISCLOSURE

Chlorinated benzenes are good reaction medium for the hydroxymethylation of 1 - substituted - 5-nitroimidazole compounds.

BACKGROUND OF THE INVENTION

Field of the invention

This invention relates generally to the synthesis of substituted imidazoles, and more particularly, it relates to the synthesis of 1-substituted-5-nitroimidazole compounds having a hydroxymethyl radical at the 2-position. Still more specifically, it is concerned with the preparation of the above compounds in a substantially water-free, chlorinated benzene reaction medium.

Description of the prior art 1-substituted-2-hydroxymethyl-5-nitroimidazoles of the formula

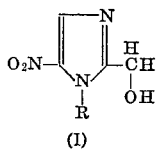

(I)

where R is loweralkyl, hydroxyalkyl or acyloxyalkyl, are useful compounds in that they exhibit antihistomonal and antitrichomonal activity. These compounds have been prepared employing diloweralkylsulfoxides as a reaction medium. While diloweralkylsulfoxides provide an excellent reaction medium for hydroxymethylation, these solvents are relatively expensive, chemically reactive in vents are relatively expensive, chemically reactive in themselves, and require recovery of the solvents by vacuum distillation because of the solvent's high boiling point and miscibility in water.

SUMMARY OF THE INVENTION

The general purpose of this invention is to provide a process of hydroxymethylation at the 2-position, of 1-substituted-5-nitroimidazoles in good yields using a chlorinated benzene reaction medium. The chlorinated benzenes are readily available solvents, are chemically unreactive and are recoverable by atmospheric steam distillation at temperatures that do not cause decomposition of product or present hazardous operating conditions. Where using the chlorinated benzene reaction solvents of our invention, 1-substituted-2-hydroxymethyl-5-nitroimidazoles are obtained in high yield and purity by hydroxymethylation of 1-substituted-5-nitroimidazoles. Because of the relative inertness and easy recoverability of chlorinated benzenes, their use as a reaction medium in commercial operation is extremely desirable. Chlorinated benzenes offer a further advantage over diloweralkyl sulfoxides as a reaction medium by being able to be recycled or reused. In this manner yields can be improved by re-reacting the unreacted starting material remaining in the mother liquir.

It is an object of the present invention to provide a class of reaction solvents in which the introduction of a hydroxymethyl radical directly into the 2-position of 1-substituted-5-nitroimidazoles is effected in high yield. A further object is the provision of a highly practical reaction medium for commercial production of 1-substituted-2-hydroxymethyl-5-nitroimidazoles from the corresponding 1-substituted-5-nitroimidazoles from the standpoint of safety of commercial operation, recovery of product, and cost of raw materials.

DESCRIPTION OF THE PREFERRED EMBODIMENTS

In accordance with this invention, we have now discovered that imidazoles of Formula I herein may be obtain in substantial yield from the corresponding 1-substituted-5-nitroimidazole by reacting such imidazoles with formaldehyde in a chlorinated benzene reaction medium. This process may be represented structurally as

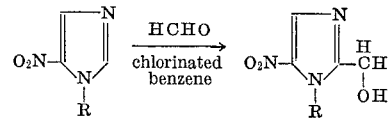

In the above structures R represents a loweralkyl radical such as methyl, ethyl, propyl, isopropyl or butyl, or a hydroxyalkyl or acyloxyalkyl substituent of the formula —$(CH_2)_nOX$ where $n$ is 1–3, and X is hydrogen or loweralkanoyl such as acetyl, propionyl, butyryl and the like, examples of which are hydroxymethyl, β-hydroxyethyl, β-acetoxyethyl, β-propionoxyethyl, β-hydroxypropyl and β-acetoxypropyl. In the preferred embodiments of the process, R is methyl, β-hydroxethyl or β-loweralkanoyloxyethyl.

According to our invention, the 1-substituted-5-nitroimidazole and formaldehyde are reacted together in a chlorinated benzene reaction medium. Chlorobenzene is the preferred solvent although other chlorinated benzenes, having a sufficiently low melting point to allow proper product crystallization, may be used such as o-dichlorobenzene, m-dichlorobenzene or the like. If desired mixtures of chlorinated benzenes may be employed as well as mixtures of the chlorinated benzenes and diloweralkylsulfoxide solvents. However, for our purposes, we have found it desirable to use a single chlorinated benzene as the solvent. The amount of chlorobenzene, or other chlorinated benzene or mixtures of solvents employed, is not critical, although sufficient solvent is used to dissolve both the 1-substituted-5-nitroimidazole and the formaldehyde reactants. Generally about 5–15 ml. of chlorinated benzene is used per gram of 1-substituted-5-nitroimidazole, and preferably about 9–12 ml. per gram of the imidazole. The reaction is carried out in an atmosphere of either ambient air or inert gas, such as nitrogen or the like. The use of an inert atmosphere, while not critical, insures that oxidation does not occur during the reaction.

The reaction medium is maintained substantially free of water, although absolute anhydrous conditions are not essential. Small amounts of water in the reaction medium may be tolerated. The process is conducted at elevated temperature with temperatures in the range of about 75°–150° C. giving good results. We prefer to employ temperatures from about 100° C.–150° C. most preferably about 120°–140° C. Reaction times from about 2–30 hours are employed, usually from 2–15 hours at reaction temperatures above 100° C., and preferably about 4–10 hours where reaction temperatures are maintained between 120°–140° C.

The reaction medium is generally maintained under superatmospheric conditions to prevent a loss of volatiles. The exact superatmospheric pressure employed is not critical and is normally dependent on the volatility of reactants and the temperature of the reaction. While higher pressure may be employed, pressures up to about 300 p.s.i. are normally satisfactory.

While the 1-substituted-5-nitroimidazole and formaldehyde may be reacted together in equal molar amounts, it is preferred that an excess of formaldehyde be used. Up to 15 moles of formaldehyde per mole of 1-substituted-5-nitroimidazole may be used, but it is generally preferred to employ about 2–8 moles of formaldehyde per mole of 1-substituted-5-nitroimidazole.

Formaldehyde as such may be added to the chlorinated benzene, or paraformaldehyde may be used as a source of formaldehyde, with the aldehyde generated directly in the reaction medium. The other starting materials for the process of our invention are described in the literature or are readily obtained by known methods from well known chemical compounds.

Representative examples of the compounds which are readily prepared by the method of this invention are 1-methyl-2-hydroxymethyl-5-nitroimidazole,
1-ethyl-2-hydroxymethyl-5-nitroimidazole,
1-($\beta$-hydroxyethyl)-2-hydroxymethyl-5-nitroimidazole,
1-($\beta$-acetoxyethyl)-2-hydroxymethyl-5-nitroimidazole,
1-($\gamma$-hydroxypropyl)-2-hydroxymethyl-5-nitroimidazole, and
1-($\beta$-hydroxypropyl)-2-hydroxymethyl-5-nitroimidazole.

The imidazoles produced by this process have activity against the parasitic disease histomoniasis and trichimoniasis and, in addition, are intermediates in the synthesis of 1-substituted-5-nitroimidazole-2-carboxamides, which latter substances have a high degree of antihistomonal and antitrichomonal activity.

The following examples are given for the purpose of illustration and not by way of limitation.

EXAMPLE 1

15 g. of 1-($\beta$-hydroxyethyl-5-nitroimidazole, 15 g. of paraformaldehyde, and 150 ml. of metadichlorobenzene are charged to a glass tube. The mixture is purged with nitrogen. The tube is sealed, placed in a mechanical shaker, and immersed in an oil bath at 130° C. for eight hours. The reacted mixture is washed from the glass tube to a beaker with 5× 15 ml. of hot dilute sulfuric acid (1N). The mass is cooled at 20° C. and gaseous ammonia bubbled through the mass. Cooling of the beaker is maintained until crystallization of 1-($\beta$-hydroxyethyl-2-hydroxymethyl-5-nitroimidazole is completed. The crystals are removed by filtration, washed with cold water and dried.

EXAMPLE 2

19.9 g. of 1-($\beta$-acetoxyethyl)-5-nitroimidazole, 15.0 g. of paraformaldehyde, and 200 ml. of chlorobenzene are charged to a glass tube. The mixture is purged with dry nitrogen and the tube is sealed. The tube is heated for 10 hours at 145° C. with shaking. The mixture is removed and dried under vacuum. The residue is extracted with 70 ml. of hot hexane. Hexane-insoluble material is dissolved in 100 ml. of benzene. The benzene solution is concentrated to about 50 ml. and hexane added slowly to induce crystallization of 1-($\beta$-acetoxyethyl)-2-hydroxymethyl-5-nitroimidazole, M.P. 88–90° C.

EXAMPLE 3

24 g. of 1-methyl-5-nitroimidazole, 30.0 g. of paraformaldehyde, and 216 ml. of chlorobenzene are charged to a glass tube, which is sealed. The tube is heated at 138° C. for 9 hours, with shaking. The mass is then added to a beaker fitted with stirrer and thermometer, where 48 ml. of 28% concentrated ammonia is added while maintaining the temperature below 45° C. The mixture is stirred for one hour. Crystallization begins at about 32° C. The mixture is then cooled to −7° C. in an ice bath for 1½ hours and then filtered. The filter cake is pressed dry and then washed with 10 ml. of ice water. After drying 22.5 g. of 1-methyl-2-hydroxymethyl-5-nitroimidazole product is obtained, M.P. 100°–113° C., for a yield of 75.5% of theory. When this procedure is repeated using 1-ethyl-5-nitroimidazole or 1-propyl-5-nitroimidazole in place of 1-methyl-5-nitroimidazole, there is obtained 1-ethyl-2-hydroxymethyl-5-nitroimidazole and 1-propyl-2-hydroxyethyl-5-nitroimidazole respectively.

EXAMPLE 4

24.0 g. of 1-methyl-5-nitroimidazole, 30.0 g. paraformaldehyde, 240 mg. butylated hydroxy toluene antioxidant, and 216 ml. of orthodichlorobenzene are charged to a glass tube. The tube is degassed and sealed. The solution is heated at 138° C. for 9 hours, with shaking. The tube is opened and its contents transferred with 5× 10 ml. hot, dilute $H_2SO_4$ to a beaker. It is heated at 103° for 2 hours, the mass is cooled to 20° C., and gaseous ammonia added. Crystallization begins at 32° C. and the mass is cooled to −3° C. for ½ hour. The solid 1-methyl-2-hydroxymethyl-5-nitroimidazole is recovered by filtration. The crystallized material is washed with ice water and dried to yield 20.5 g. of 1-methyl-2-hydroxymethyl-5-nitroimidazole product, M.P. 110.5°–112.5° C. for a yield of 69% of theory.

EXAMPLE 5

Further recovery of product is obtained by recycling or reusing the chlorinated benzene reaction solvent. A 500 ml. batch of chlorobenzene reaction solvent recovered from a hydroxymethylation following the procedure of Example 3 is treated with 50 g. of ammonium sulfate, backwashed with 50 ml. of water and dried over 50 g. of molecular sieves. 216 ml. of dry chlorobenzene is recovered containing 2.2 g. of unreacted 1-methyl-5-nitroimidazole. Following the procedure of Example 3 this chlorobenzene is placed in a glass tube to which is added 21.8 g. of fresh 1-methyl-5-nitroimidazole (to make 24 g. total) and 30 g. of paraformaldehyde. The mixture is purged with nitrogen and the glass tube sealed. The tube is heated for 9 hours at 138° C. The tube is broken and its contents worked up as in Example 3. 22.2 g. of 1-methyl-2-hydroxymethyl-5-nitroimidazole are recovered for a 74.5% yield of theory. 170 ml. of reaction medium are recovered containing 3.5 g. of starting material for a total conversion of 90%.

Any departure from the above description which conforms to the present invention is intended to be included within the scope of the claims.

We claim:
1. In a process for the preparation of a 5-nitroimidazole of the formula:

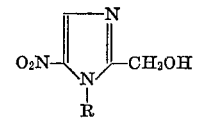

wherein R is selected from the group consisting of loweralkyl and $(CH_2)_nOX$, where $n$ has a value of from 1 to 3 and X represents a member of the group consisting of hydrogen and loweralkanoyl, which comprises treating a 5-nitroimidazole of the formula:

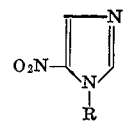

with formaldehyde at an elevated temperature, wherein R is as defined above, the improvement which comprises carrying out said reaction in a substantially anhydrous chlorinated benzene solvent medium containing mother liquor from a prior hydroxymethylation in the same chlorinated benzene.

2. The process of claim 1 in which the chlorinated benzene is chlorobenzene.

3. The process of claim 1 in which said reaction is carried out at superatmospheric pressure.

References Cited

UNITED STATES PATENTS

| | | | |
|---|---|---|---|
| 3,280,139 | 10/1966 | Klosa | 260—309 |
| 3,290,328 | 12/1966 | Kollonitsch | 260—309 |
| 3,359,096 | 10/1967 | Rooney | 260—309 |

FOREIGN PATENTS 939,681  10/1963  Great Britain _____ 260—309

OTHER REFERENCES

Grindley et al.: J. Chem. Soc. (London), 1927, pp. 3128–36.

Jones: J. Amer. Chem. Soc., vol. 71, pp. 383-6 (1949).

NATALIE TROUSOF, Primary Examiner

U.S. Cl. X.R.

260—999